United States Patent
Zhao et al.

(10) Patent No.: US 12,366,849 B2
(45) Date of Patent: Jul. 22, 2025

(54) ACTION TRIGGER METHOD AND APPARATUS

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Junjie Zhao, Beijing (CN); Jing Su, Beijing (CN); Qian Zhang, Beijing (CN); Yanqiu Zhao, Beijing (CN); Xinan Wang, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 919 days.

(21) Appl. No.: 17/611,667

(22) PCT Filed: May 20, 2020

(86) PCT No.: PCT/CN2020/091418
§ 371 (c)(1),
(2) Date: Nov. 16, 2021

(87) PCT Pub. No.: WO2020/233636
PCT Pub. Date: Nov. 26, 2020

(65) Prior Publication Data
US 2022/0197258 A1    Jun. 23, 2022

(30) Foreign Application Priority Data
May 20, 2019 (CN) .......................... 201910420255.6

(51) Int. Cl.
G05B 19/418 (2006.01)

(52) U.S. Cl.
CPC .. *G05B 19/41865* (2013.01); *G05B 19/41835* (2013.01); *G05B 2219/23463* (2013.01); *G05B 2219/2642* (2013.01)

(58) Field of Classification Search
None
See application file for complete search history.

(56) References Cited

U.S. PATENT DOCUMENTS 9,215,270 B2 * 12/2015 Mohaban ............... H04L 67/63
2016/0162478 A1 * 6/2016 Blassin .......... G06Q 10/063112
706/12

(Continued)

FOREIGN PATENT DOCUMENTS

CN    103543700 A    1/2014
CN    105159079 A    12/2015
(Continued)

OTHER PUBLICATIONS

Tolosana-Calasanz et al., "Feedback-Control & Queueing Theory-Based Resource Management for Streaming Applications", Apr. 1, 2017, IEEE, IEEE Transactions on Parallel and Distributed Systems (vol. 28, Issue: 4, 2017, pp. 1061-1075) (Year: 2017).*

(Continued)

*Primary Examiner* — Davoud A Zand
(74) *Attorney, Agent, or Firm* — Chiwin Law LLC

(57) ABSTRACT

An action trigger method and apparatus for triggering an operation. The action trigger method includes: determining a resource of a first action S402, wherein the resource of the first action includes an identifier of a target resource and a first rule being used to trigger, according to a first condition, a first operation with respect to the target resource; determining a resource of a second action according to the target resource S404, wherein the resource of the second action includes a second rule being used to trigger, according to a second condition, a second operation with respect to the (Continued)

target resource; and determining, on the basis of the second condition, a dependence condition for the first action S406, wherein the first action is used to trigger a first operation with respect to the target resource when the first condition and the dependence condition are both met.

20 Claims, 14 Drawing Sheets

(56) References Cited

U.S. PATENT DOCUMENTS

| | | |
|---|---|---|
| 2018/0199356 A1 | 7/2018 | Yang |
| 2019/0182286 A1* | 6/2019 | Zini .................... H04L 63/1416 |
| 2020/0192714 A1* | 6/2020 | Clow .................... G06F 9/5011 |

FOREIGN PATENT DOCUMENTS

| | | |
|---|---|---|
| CN | 105487495 A | 4/2016 |
| CN | 105807728 A | 7/2016 |
| CN | 105843057 A | 8/2016 |
| CN | 106357596 A | 1/2017 |
| CN | 106371326 A | 2/2017 |
| CN | 106527168 A | 3/2017 |
| CN | 106547216 A | 3/2017 |
| CN | 107248943 A | 10/2017 |
| CN | 207131249 U | 3/2018 |
| CN | 108600059 A | 9/2018 |
| KR | 20130073464 A | 7/2013 |
| WO | 2016122023 A1 | 8/2016 |

OTHER PUBLICATIONS

First Office Action issued in the corresponding CN201910420255.6 with Search Report, dated Apr. 18, 2023.

* cited by examiner

ACTION TRIGGER METHOD AND APPARATUS

CROSS-REFERENCE TO RELATED APPLICATIONS

This application is a U.S. National Phase Entry of International Application No. PCT/CN2020/091418, filed on May 20, 2020, designating the Chinese Patent Application No. 201910420255.6, filed on May 20, 2019, for all purposes, the entire disclosures of the aforementioned applications are incorporated by reference as part of the disclosure of the present application.

TECHNICAL FIELD

The present disclosure relates to a field of Internet of Things, and more particularly to an action trigger method and an apparatus for a target resource.

BACKGROUND

In an Internet of Things system, an application entity as an application program may deploy services on a general service entity as a service platform. After the service is deployed on the service platform, the application program may realize operations of the service directly on the service platform without participating in a process of realizing the service. For example, the service platform may provide general service functions for a plurality of different application programs.

SUMMARY

To this end, the present disclosure provides an action trigger method and an apparatus for a target resource.

According to an aspect of the present disclosure, an action trigger method performed by a general service entity is provided. The method includes: determining a first action resource, wherein the first action resource comprises an identifier of a target resource and a first criterion, and the first criterion is used for triggering a first operation for the target resource according to a first condition; determining a second action resource according to the target resource, wherein the second action resource comprises a second criterion, and the second criterion is used for triggering a second operation for the target resource according to a second condition; and determining a dependency condition for a first action according to the second condition, wherein the first action is used for triggering the first operation for the target resource in response to that the first condition and the dependency condition are all satisfied.

In some embodiments, determining the second action resource according to the target resource includes: determining an action resource list including at least one candidate action resource, in which each candidate action resource of the at least one candidate action resource includes the target resource; selecting at least one candidate action resource from the action resource list as the second action resource. According to some embodiments of the disclosure, determining whether a re-notification criterion is satisfied includes: determining, at a time point determined by a check event notification interval, whether an event notification rule is satisfied, and in the case where the event notification rule is satisfied, determining that the re-notification criterion is satisfied.

In some embodiments, in which determining the second action resource according to the target resource includes: determining an action resource list including at least one candidate action resource, in which each candidate action resource of the at least one candidate action resource includes the target resource; selecting at least one candidate action resource from the action resource list as the second action resource.

In some embodiments, the second operation is different from the first operation.

In some embodiments, the second operation is opposite to the first operation.

In some embodiments, a priority of the second action resource is higher than a priority of the first action resource.

In some embodiments, the priority of the first action resource is determined according to at least one of the target resource and the first criterion.

In some embodiments, the second condition is that a preset variable is greater than a first threshold, and the dependency condition is that the preset variable is less than or equal to the first threshold.

In some embodiments, the dependency condition is that the preset variable is less than or equal to a second threshold, in which the second threshold is less than the first threshold.

In some embodiments, the first condition includes an action effective time of the first action, the second condition includes an action effective time of the second action, and the action effective time of the first action overlaps with the action effective time of the second action.

According to another aspect of the present disclosure, a method for triggering operations against a target resource is provided. The method includes: determining a first subject resource; determining a first action resource, in which the first action resource is used for triggering a first operation for the target resource in response to that a first condition and a dependency condition are all satisfied; determining a second subject resource associated with the dependency condition in response to that the first subject resource satisfies the first condition; and triggering the first operation for the target resource in response to that the second subject resource satisfies the dependency condition, in which the dependency condition is determined according to a second action resource.

In some embodiments, the method further includes: determining the second action resource associated with the target resource and the second subject resource in response to that the second subject resource does not satisfy the dependency condition, in which the second action resource includes a second criterion, and the second criterion is used for triggering a second operation for the target resource according to a second condition; and triggering the second operation for the target resource in response to that the second subject resource satisfies the second condition.

According to another aspect of the present disclosure, an action trigger apparatus performed by a general service entity is provided. The apparatus includes: a receiving unit, configured to determine a first action resource, in which the first action resource includes an identifier of a target resource and a first criterion, and the first criterion is used for triggering a first operation for the target resource according to a first condition; an action resource determining unit, configured to determine a second action resource according to the target resource, in which the second action resource includes a second criterion, and the second criterion is used for triggering a second operation for the target resource according to a second condition; and a dependency condition determining unit, configured to determine a dependency condition for a first action according to the second condition, in which the first action is used for triggering the first operation for the target resource in response to that the first condition and the dependency condition are all satisfied.

In some embodiments, the action resource determining unit is further configured to: determine an action resource list comprising at least one candidate action resource, wherein each candidate action resource of the at least one candidate action resource comprises the target resource; and select at least one candidate action resource from the action resource list as the second action resource.

In some embodiments, the second operation is different from the first operation.

In some embodiments, the second operation is opposite to the first operation.

In some embodiments, a priority of the second action resource is higher than a priority of the first action resource.

In some embodiments, the priority of the first action resource is determined according to at least one of the target resource and the first criterion.

In some embodiments, the second condition is that a preset variable is greater than a first threshold, and the dependency condition is that the preset variable is less than or equal to the first threshold.

In some embodiments, the dependency condition is that the preset variable is less than or equal to a second threshold, in which the second threshold is less than the first threshold.

In some embodiments, the first condition includes an action effective time of the first action, the second condition includes an action effective time of the second action, and the action effective time of the first action overlaps with the action effective time of the second action.

According to yet another aspect of the present disclosure, an apparatus for triggering operations against a target resource is provided. The apparatus includes: a subject resource determining unit, configured to determine a first subject resource; an action determining unit, configured to determine a first action resource, in which the first action resource is used for triggering a first operation for the target resource in response to that a first condition and a dependency condition are all satisfied; a dependency determining unit, configured to determine a second subject resource associated with the dependency condition in response to that the first subject resource satisfies the first condition; and a trigger unit, configured to trigger the first operation for the target resource in response to that the second subject resource satisfies the dependency condition, in which the dependency condition is determined according to a second action resource.

In some embodiments, in response to that the second subject resource does not satisfy the dependency condition, the action determining unit is further configured to: determine the second action resource associated with the target resource and the second subject resource, in which the second action resource includes a second criterion, and the second criterion is used for triggering a second operation for the target resource according to a second condition; and the trigger unit is further configured to trigger the second operation for the target resource in response to that the second subject resource satisfies the second condition.

According to yet another aspect of the present disclosure, an action trigger method performed by a general service entity is provided. The method includes: determining a first action resource, in which the first action resource includes an identifier of a target resource, a first criterion and an action effective time, and the first criterion is used for triggering a first operation for the target resource according to a first condition; determining a continuous activation period of the first criterion based on the action effective time; performing, during the continuous activation period of the first criterion, an operation of determining whether the first condition is satisfied, in which the first operation is triggered for the target resource in response to that the first condition is determined to be satisfied.

In some embodiments, the performing the operation of determining whether the first condition is satisfied includes: performing the operation of determining whether the first condition is satisfied with a predefined trigger cycle.

In some embodiments, the performing the operation of determining whether the first condition is satisfied includes: performing the operation of determining whether the first condition is satisfied in response to that a predefined detection condition is satisfied.

In some embodiments, the method further includes: after the first operation is triggered for the target resource, obtaining an execution result of the first operation, in which the execution result indicates whether the first operation is triggered correctly; and terminating, within the continuous activation period of the first criterion, the trigger of the first operation for the target resource in response to that the execution result indicates that the first operation is not triggered correctly.

In some embodiments, the target resource further includes an identifier of an action trigger, and after the first operation is triggered for the target resource, the method further comprises: setting the identifier of the action trigger such that identifier of the action trigger is associated with the first action resource or setting identifier of the action trigger to be true.

In some embodiments, identifier of the action trigger includes a resource identifier of the first action resource and/or a first priority identifier of the first action resource.

In some embodiments, the method further includes: determining a second action resource, in which the second action resource includes the identifier of the target resource and a second criterion, the second criterion is used for triggering a second operation for the target resource according to a second condition, the first action resource further includes a first priority, and the second action resource further includes a second priority; determining that the second priority is greater than the first priority; triggering the second operation for the target resource according to the second condition, and updating the identifier of the action trigger such that the identifier of the action trigger is associated with the second action resource.

In some embodiments, the method further includes: creating an action management resource, in which the action management resource includes the identifier of the target resource, an action resource identifier list corresponding to the target resource, and an action resource identifier currently operating the target resource.

In some embodiments, the method further includes: after the first operation is triggered according to the first condition, setting the action resource identifier currently operating the target resource as an identifier of an action that triggers the first operation.

According to yet another aspect of the present disclosure, an electronic device is provided, the electronic device including a processor and a memory, wherein the memory stores instructions thereon, which, when performed by the processor, cause the processor to perform the method as previously described.

According to yet another aspect of the present disclosure, a non-transitory computer-readable storage medium is provided. The medium stores instructions thereon which, when performed by the computer, cause the computer to perform the method as previously described.

With the method and apparatus provided in the present disclosure, the second action resource that triggers the operation for the same target resource is determined according to the target resource included in the creation request of the first action resource, and the dependency condition of the first action is determined according to the trigger condition of the second action resource, which may avoid the conflict between the criterions of different action resources, and improve the execution efficiency of the action.

BRIEF DESCRIPTION OF THE DRAWINGS

In order to illustrate technical solutions of embodiments of the present disclosure more clearly, accompanying drawings used for description of the embodiments will be briefly described below. Obviously, the accompanying drawings in the following description are only some embodiments of the present disclosure. For those of ordinary skill in the art, other accompanying drawings may be obtained from these accompanying drawings without creative work. The following accompanying drawings are not deliberately scaled and drawn in proportion to the actual size, but focus on illustrating the gist of the present disclosure.

DETAILED DESCRIPTION OF THE EMBODIMENTS

In order to make objectives, technical solutions, and advantages of the present disclosure clearer, the following embodiments are used to further illustrate the present disclosure in detail. Obviously, the described embodiments are only a part of the embodiments of the present disclosure, rather than all the embodiments. Based on the embodiments in the present disclosure, all other embodiments obtained by those of ordinary skill in the art without creative work fall within the protection scope of the present disclosure.

With the development of information technology, especially Internet technology, the Internet of Things technology used to realize informatization, remote management and control, and intelligent networks is gradually maturing. The Internet of Things uses communication technologies such as local networks or the Internet to connect sensors, controllers, machines, people, and things together in a new way, to form connections between people and things, or things and things. The Internet of Things is an extension of the Internet, includes the Internet and all resources on the Internet, and is compatible with all applications of the Internet. With applications of the Internet of Things technology in various fields, various new application fields such as smart home, smart transportation, smart health and the like have emerged.

Figure 1:
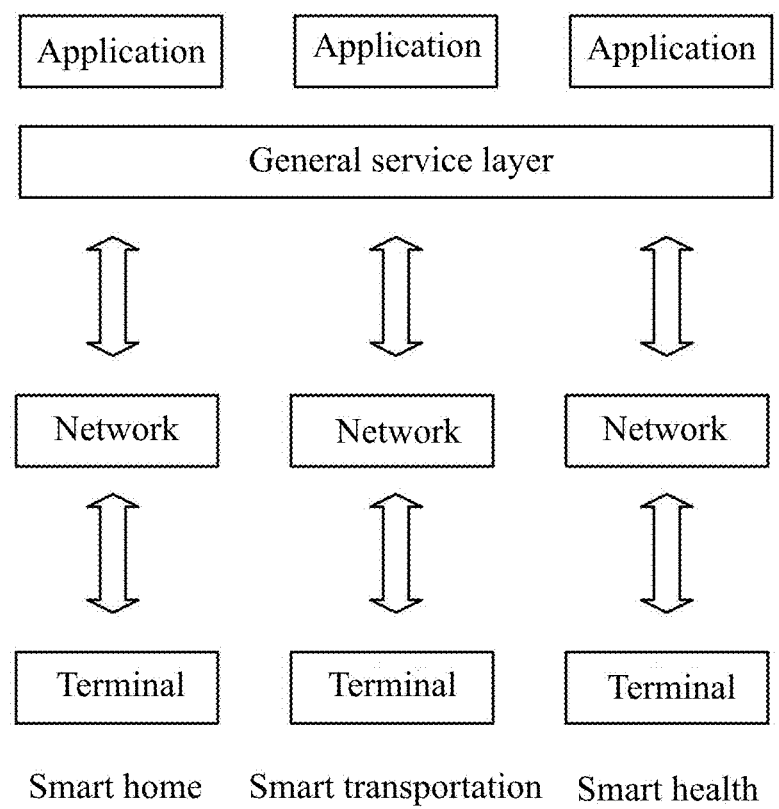
FIG. 1 discloses a schematic architecture diagram of the Internet of Things according to the present disclosure.

FIG. 1 discloses a schematic architecture diagram of the Internet of Things according to the present disclosure. As shown in FIG. 1, various client devices serving as terminals access the network and access a general service layer through the network, while the general service layer supports various applications, thus a terminal+network+application architecture is formed. For example, in the field of smart home, the terminal may be various household devices. The household devices may access a general service platform by using a local area network (LAN), and such LAN access may be wireless or wired, for example. Optionally, the local area network may be a personal area network (PAN), for example, taking a wireless personal area network (WPAN) as an example, various technologies such as Bluetooth, IrDA, Home RF, ZigBee, or UWB (Ultra-Wideband Radio) may be used to achieve access.

As mentioned above, when an Internet of Things entity (for example, a software module in an Internet of Things terminal device, or a software module in a node device) transmits data or information to the general service entity, the data or information may be stored as separate resources. In addition, the Internet of Things entity may transmit a request to the general service entity, so as to update the resources stored on the general service entity corresponding to the Internet of Things entity, thereby reflecting a status of the device on which the Internet of Things entity is operated. Update may be performed in real time or periodically, or may be triggered by a certain condition. Therefore, other Internet of Things entities communicating with the general service entity may learn the status of the device corresponding to the Internet of Things entity by accessing the updated resources; or, other Internet of Things entities communicating with the general service entity may perform operations on the updated resources. It should be noted that the resources referred to herein include resources of various entities (for example, which may be embodied as software modules in Internet of Things devices, such as AE, CSE and other entities). An entity may represent a software module of a communication device, while a general service entity may represent a software module of a service platform, and the service platform may be local or remote. Optionally, performing operations on the updated resources includes, for example, obtaining information of the updated resources, deleting the information of the updated resources, notifying the information of the updated resources to a third party, or performing operations on other resources based on the information of the updated resources.

In the present disclosure, the described entities (for example, the application entity AE and the general service entity CSE), data and the like may be represented by resources. A resource may have a unique identifier, and includes attributes and sub-resources, where the attributes are used to store resource-related information, and the sub-resources are next-level resources of the resource, and the resource includes indexes pointing to the sub-resources.

Taking smart home as an example, Table 1 shows examples of actions that may exist in the Internet of Things environment.

TABLE 1

| Trigger conditions | Operations | Target objects |
| --- | --- | --- |
| A door is opened | Turn on | Camera |
| At night | Turn off | Headlight in sleeping room |
|  | Turn on | Lamplet |
| Fall asleep | Turn off | Lamplet |
| Getting up during sleep | Turn on | Lamplet |
| Lying in bed during sleep | Turn off | Lamplet |
| After a deep sleep | Turn up | Air conditioner |
| Sunny day | Open | Window |
| Cloudy, rainy or snowy days | Close | Window |
| Gas leakage | Open | Window |
| Human body sensor | Turn on | Lamplet |
| Smoke alarm | Open | Window |
| Door and window sensor | Turn on | Camera |
| Door and window sensor | Turn on | Corridor light |
| Human body sensor does not detect a person | Turn on | Floor sweeping robot |
| Temperature sensor + human body sensor | Turn on | Air conditioner |
| Position sensor detects someone in a certain range | Turn on | Air conditioner, light, etc. |
| Temperature sensor detects fever | Turn off | Air conditioner |

As shown in Table 1, according to different usage scenarios, a plurality of different action resources may be set for a same target object in different situations. Trigger conditions of action resources set for the same target object by different action resources may be different, and operations set for the target object may be the same or different. Trigger events shown in Table 1 are only schematic examples. In fact, those skilled in the art may set any action trigger events according to the actual situations. In some embodiments, action trigger events may be divided into location events (for example, setting that an event occurs at a certain location), time events (for example, setting that an event occurs at a certain time), operation events (for example, setting that an event is produced by a certain operation) and user events (for example, perception of an existence of a certain user).

For example, as can be seen from Table 1, operations for a lamplet may include turning on and turning off. For example, when it is detected that it is at night or the owner gets up during sleep, the lamplet may be turned on. When it is detected that the owner falls asleep or is lying on the bed during sleep, the lamplet may be turned off. For another example, when a sunny day, a gas leakage or a smoke alarm is detected, the window may be opened. When a cloudy, rainy or snowy day is detected, the window may be closed.

In some embodiments, action resources may also be aimed at a plurality of targets. For example, when a position sensor detects the presence of someone within a certain range, a plurality of target objects (such as air conditioners, lights, etc.) may be controlled to be turned on.

In other embodiments, the action resources may also set a plurality of trigger conditions for operations on the target resources. For example, when a temperature sensor detects that the temperature is higher or lower than a preset temperature threshold, and a human body sensor detects people in the room, the air conditioner may be controlled to be turned on.

As can be seen from Table 1, due to the complex operating environment of the smart home, there may be a plurality of different action resources for a same target object. Therefore, there may be conflicting operation instructions for a same target object. For example, under a rainy weather condition, the server will control the windows to be closed. However, if a smoke alarm detects an excessive amount of smoke in the air at the same time, the server will control the windows to be opened. In this case, if firstly an excessive amount of smoke is detected in the air, the server will control the windows to be opened, and if a rain is detected later, the server will control the windows to be closed instead.

It should be understand that if the smoke alarm detects an excessive amount of smoke in the air, it means that there may be an emergency situation such as a fire in the room. In this case, if the server controls the window to be closed because rain is detected, people in the room may be put in danger.

In addition, if trigger conditions of two different operations for a same target resource are satisfied at the same time, it will be difficult for the server to achieve effective control of the target resource.

To this end, the present disclosure provides a method for creating the action resources.

Figure 2:
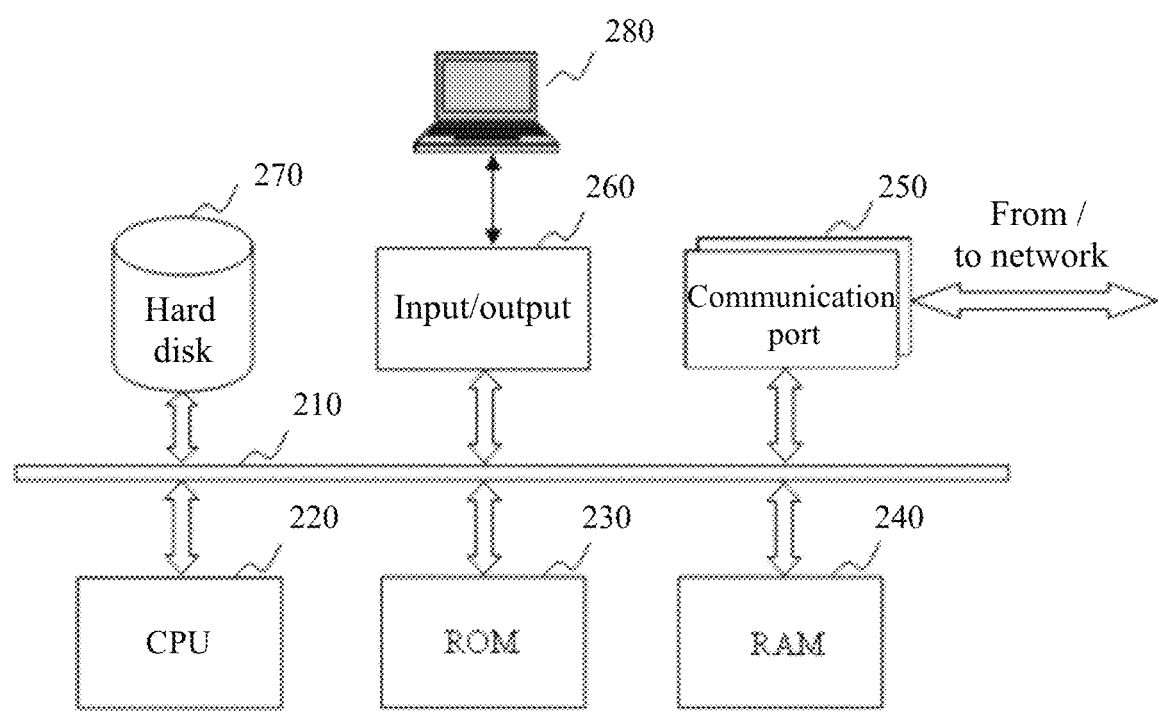
FIG. 2 shows a schematic diagram of a server/client apparatus according to the embodiments of the present disclosure.

FIG. 2 shows a schematic diagram of the server/client device according to the embodiments of the present disclosure. In the Internet of Things system, the server may be used to implement the aforementioned service platform, and the client device may be used to implement the aforementioned terminal device.

FIG. 2 is an architecture of a computer device according to some embodiments of the present disclosure. Such computer device may be used to implement the server device or the client device disclosed in this disclosure. Such computers may include personal computers, laptops, tablets, mobile phones, personal digital assistances (PDAs), smart glasses, smart watches, smart rings, smart helmets, and any smart portable devices or wearable devices. In some embodiments, the architecture of the computing device as shown in FIG. 2 may also be used to implement various smart home terminal devices in the Internet of Things system, such as smart switches, smart gateways, smart rice cookers, smart purifiers, etc. The specific system in this embodiment explains a hardware platform including a user interface by using a functional block diagram. Such computer device may be one general-purpose computer device or one special-purpose computer device, both of which may be used to implement the server device or the client device of the terminal in this embodiment. A computer system 200 may implement any of currently described components that provide information required for Internet of Things communication. For example, the computer system 200 may be implemented by the computer device through its hardware device, software program, firmware, and a combination thereof. For the sake of convenience, only one computer device is drawn in FIG. 2, but the relevant computer functions described in this embodiment to provide information required for Internet of Things communication may be implemented in a distributed manner by a group of similar platforms, thereby distributing the processing load of the system.

The computer system 200 may include a communication port 250, which is connected to a network for data communication. The computer system 200 may further include a processor 220 for performing program instructions. The processor 220 may be composed of at least one processor. The computer 200 may include an internal communication bus 210. The computer 200 may include different forms of program storage units and data storage units, such as a hard disk 270, a read only memory (ROM) 230, and a random access memory (RAM) 240, which may be used to store various data files for computer processing and/or communication, and possible program instructions performed by the processor 220. The computer system 200 may further include an input/output component 260 to support input/output data flow between the computer system 200 and other components (such as the user interface 280). The computer system 200 may also transmit and receive information and data through the communication port 250.

In some embodiments, the aforementioned computer system 200 may be used to form the server in the Internet of Things communication system. The server of the Internet of Things communication system may be a server hardware device or a server group. Various servers in the server group may be connected through a wired or wireless network. The server group may be centralized, for example, a data center. The server group may also be distributed, for example, a distributed system.

The computing device provided in FIG. 2 may be used to implement a client application entity AE, a client general service entity CSE, a server application entity AE, and/or a server general service entity CSE involved in the present disclosure.

Different aspects of the method for providing information required for data communication of the Internet of Things communication and/or the method for implementing other steps by programs are outlined above. The program part in the technology may be regarded as a "product" or "article" in the form of executable code and/or related data, which participates in or is realized by a non-transitory computer-readable medium. A tangible, non-transitory permanent storage medium may include any storage or memory used by computers, processors, similar devices or related modules, for example, various semiconductor memories, tape drives, disk drives, or similar devices that may provide storage functions for software.

Figure 3A:
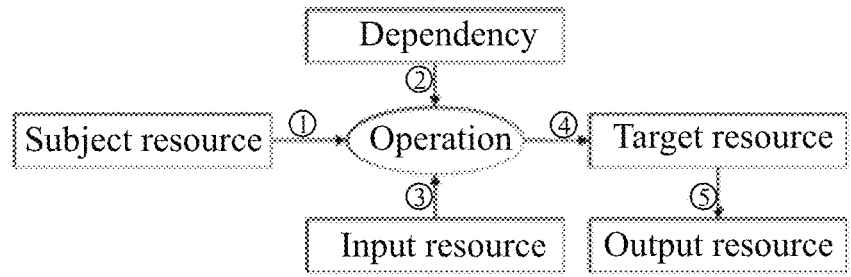
FIG. 3A shows a schematic example of a process of performing action trigger in an Internet of Things platform according to the embodiments of the present disclosure.

FIG. 3A shows a schematic example of a process of performing action trigger in the Internet of Things platform according to the embodiments of the present disclosure.

As shown in FIG. 3A, in step 1, a change of a subject resource and whether the change of the subject resource satisfies a defined trigger condition are detected. When the trigger condition is satisfied, the operation for a target resource is triggered to change a state of the target resource.

In step 2, before performing the operation, whether all dependency conditions have been satisfied may be confirmed.

In step 3, if all dependency conditions have been satisfied, input parameters for the operation may be determined. Such input parameters will be obtained by reading input attributes of action resources.

In step 4, the operation may be transmitted to the target resource. The operation may be any operation such as creation, update, deletion, or notification.

In step 5, after performing the operation for the target resource, the state of the target resource may be changed. For example, on/off for a specific device may be realized.

In the embodiments provided by the present disclosure, taking the operation performed for the window as an example, the server may transmit a notification to a window controller to control opening and closing of the window by using the process as shown in FIG. 3A. For the convenience of description in the following description, the target resource of the action resource may also be considered as the window.

Figure 3B:
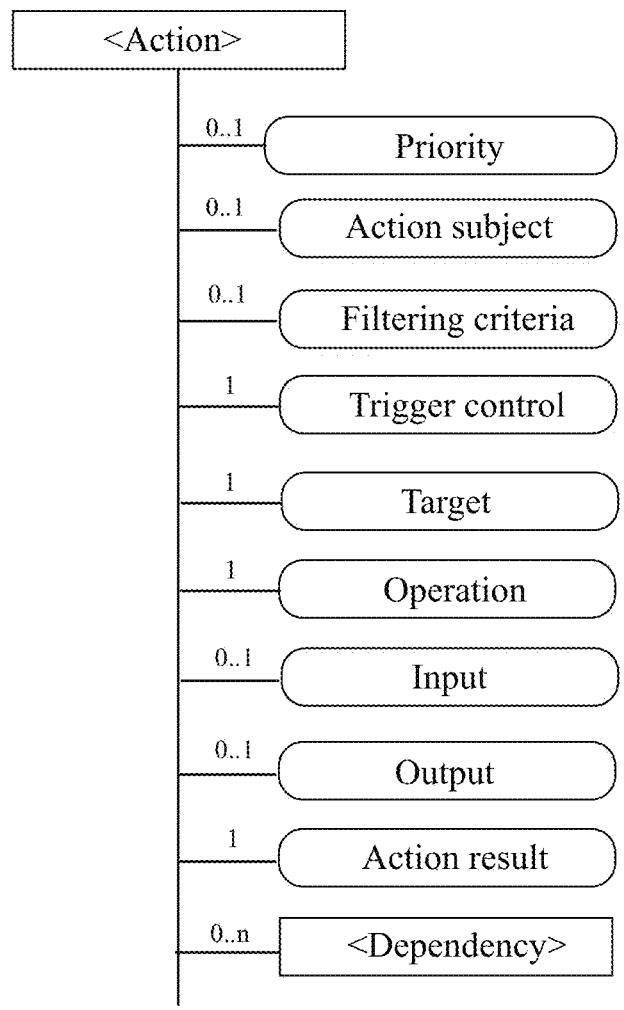
FIG. 3B shows an example of an action resource according to the embodiments of the present application.

FIG. 3B shows an example of an action resource (<action>) according to the embodiments of the present application.

As shown in FIG. 3B, the action resource may include at least one attribute and/or sub-resource. For example, the action resource <action> may include a priority attribute (priority) that indicates a priority of the action resource, a subject resource attribute (actionSubjectResource) that indicates an object to be detected of the action resource, and a filtering criteria attribute (filterCriteria) that indicates an action trigger condition of the action resource, a trigger control attribute (evalControl) that indicates a trigger mode of the action resource, a target attribute (objectResource) that indicates a control target of the action resource, an operation attribute (operation) that indicates an operation mode of the action resource, an input attribute (input) that indicates operation parameters of the operation, an output resource attribute (outputResource) that indicates operation results of the action resource, an action result attribute (actionResult) that indicates action results of the action resource, and a dependent sub-resource (<dependency>) that indicates dependency conditions of actions performed by the action resource.

The subject resource attribute of the action resource may be updated in a predefined manner. For example, an application entity registered on the server may transmit information to the server periodically or in response to occurrence of a preset event, to update the subject resource attribute. When the information received from the application entity makes the subject resource of the action resource satisfies an action trigger condition of the action resource, a preset operation may be performed for the target attribute of the action resource. In this document, the subject resource attribute may also be abbreviated as the subject resource.

In some embodiments, the filtering criteria attribute may include at least one trigger condition, and the dependency sub-resource may include at least one dependency condition. The action resource shown in FIG. 3B is used to perform a preset operation, that is, the operation defined in the operation attribute, for the target included in the target attribute when the trigger condition included in the filtering criteria attribute and the dependency condition included in the dependency sub-resource are satisfied.

The number before each attribute and sub-resource shown in FIG. 3B indicates whether the attribute or sub-resource is optional. For example, the number 1 before the target attribute indicates that the target resource attribute is mandatory. In other words, all action resources need to define the target attribute, that is, target objects of actions realized by the action resources. For another example, the number 0 . . . 1 before the priority attribute indicates that the priority attribute is optional. In other words, not all action resources must include the priority attribute. For yet another example, the number 0 . . . n before the dependency sub-resource indicates that the dependency sub-resource is also optional.

Although the present disclosure shows one schematic example of implementing the action resource, those skilled in the art may understand that, depending on the actual situations, the aforementioned action resource may also be set in other ways.

Figure 4:
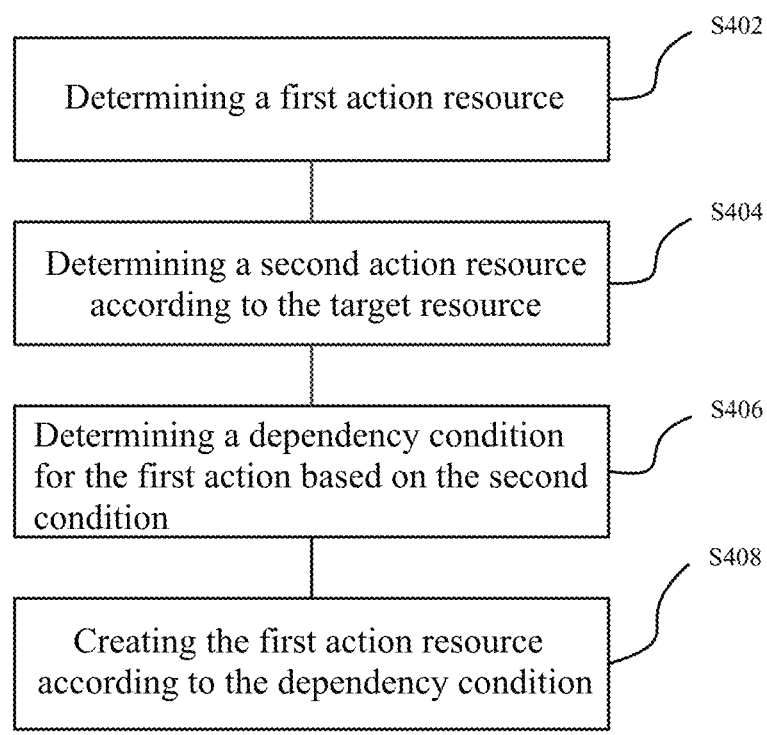
FIG. 4 shows a flowchart of a method for creating action resources performed by a general service entity according to the embodiments of the present disclosure.

FIG. 4 shows a flowchart of an action trigger method performed by the general service entity according to the embodiments of the present disclosure. A method 400 shown in FIG. 4 may be performed by the aforementioned general service entity. Taking the usage environment of the smart home as an example, the aforementioned general service entity may be realized by a home management server, and the application entity may be realized by a home management application device (for example, a human body sensor, a temperature sensor, a door and window sensor, etc.).

As shown in FIG. 4, in step S402, a first action resource may be determined, wherein the first action resource includes an identifier of the target resource and a first criterion, and the first criterion is used for triggering a first operation for the target resource according to a first condition.

The first action resource may be a resource used to implement a first action. For example, when an application program wants to deploy an action on the service platform, it may transmit a creation request for an action resource to the service platform. For example, the home management application may deploy such an action on the home management server: when the concentration of carbon monoxide in the air is detected to be higher than a threshold A, an opening operation is performed for the window. The concentration of carbon monoxide in the air may be detected by a carbon monoxide sensor registered to the service platform, and the opening operation for the window may be performed by a window controller registered to the service platform.

In step S404, a second action resource may be determined according to the target resource, wherein the second action resource includes a second criterion and the second criterion is used for triggering a second operation for the target resource according to a second condition. Taking the usage environment of the smart home as an example, it should be understood that when there are a plurality of smart control devices in the Internet of Things environment of the smart home, the application program may deploy a plurality of services to the same target object, that is, create a plurality of action resources for the same target object. The operations performed for the target object of each action resource and the trigger conditions of the operations may be different.

When a creation request for the action resource is received, other action resources with the same target resource may be determined as the second action resource among a plurality of resources stored in the server according to the target resource in the action resource. According to the trigger condition involved in the second action resource for the same target resource, the dependency condition of the action resource to be created may be determined.

In some embodiments, an action resource list including at least one candidate action resource may be determined, wherein each candidate action resource of the at least one candidate action resource includes the target resource. Then, at least one candidate action resource may be selected from the action resource list as the second action resource.

In one implementation, when selecting at least one candidate action resource as the second action resource from the action resource list, the selection may be made according to the operation for the target resource performed by the candidate action resource. For example, if the second operation performed by the candidate action resource for the target resource is different from the aforementioned first operation, the candidate action resource may be selected as the second action resource. In one example, the first operation may refer to setting the air conditioner to 25° C., and the second operation may refer to setting the air conditioner to 18° C. For another example, if the second operation performed by the candidate action resource for the target resource is opposite to the aforementioned first operation, the candidate action resource may be selected as the second action resource. In one example, the first operation may refer to open the window, and the second operation may refer to close the window.

In another implementation, when selecting at least one candidate action resource as the second action resource from the action resource list, the selection may also be made according to the priority of the candidate action resource. For example, a candidate action resource whose priority is higher than that of the first action resource may be determined as the second action resource. That is, a priority of the second action resource is higher than a priority of the first action resource.

When creating the action resource, the priority of the action resource may be determined according to the target resource and the criterion included in the creation request of the action resource. In one example, a priority of the action resource corresponding to a security device may be set to the highest, a priority of the action resource corresponding to a protective device may be set to the second highest, and a priority of the action resource corresponding to a health device may be set to the lowest.

For example, the security device may refer to device that guarantees home safety, such as the carbon monoxide sensors and the smoke alarms. The protective device may refer to device used for personal protection, such as the haze sensors, and the health device may refer to device related to personal health, such as the temperature sensors.

In step S406, a dependency condition for the first action may be determined based on the second condition.

In some embodiments, a condition that does not satisfy the second condition may be determined as the dependency condition of the first action. In one implementation, a set of candidate dependency conditions different from the second condition may be determined, and at least one candidate dependency condition of the set of candidate dependency conditions may be determined as the dependency condition of the first action. For example, a condition opposite to the second condition may be determined as the dependency condition of the first action.

For example, when the second condition is that a preset variable is greater than a first threshold A, the dependency condition may be determined as that the preset variable is less than or equal to the first threshold A. Further, the dependency condition may also be any condition that is opposite to the second condition. For example, the dependency condition may be determined as that the preset variable is less than or equal to a second threshold B, where B<A. For another example, when the second condition is that the host is at home, the dependency condition may be determined as that the host is not at home. Similarly, when the second condition is that the preset variable is less than a third threshold C, the dependency condition may be determined as that the preset variable is greater than or equal to the third threshold C. Further, the dependency condition may also be determined as that the preset variable is greater than or equal to a fourth threshold D, where D>C.

In addition, the dependency condition may also be any other condition different from the second condition. When the second condition is that the weather is sunny, the dependency condition may be determined as that the weather is rainy or the weather is cloudy.

In step S408, the first action resource may be created according to the dependency condition, where the first action is used to trigger the first operation for the target resource when the first condition and the dependency condition are all satisfied at the same time.

In some embodiments, the first condition may include an action effective time of the first action, and the second condition may include an action effective time of the second action, where the action effective time of the first action overlaps with the action effective time of the second action.

With the method for creating action resources provided in this application, the dependency condition of the action resource to be created may be determined according to the trigger condition of the action resource with respect to the same target, so that the action involved in the created action resource need to trigger the corresponding action when its own trigger condition and the dependency condition are satisfied at the same time, thus, for example, the criterion with a low-priority will not affect the execution of the criterion with a high-priority, therefore, conflicts between criteria of different action resources may be avoided, and the execution efficiency of actions may be improved.

Figure 5A:
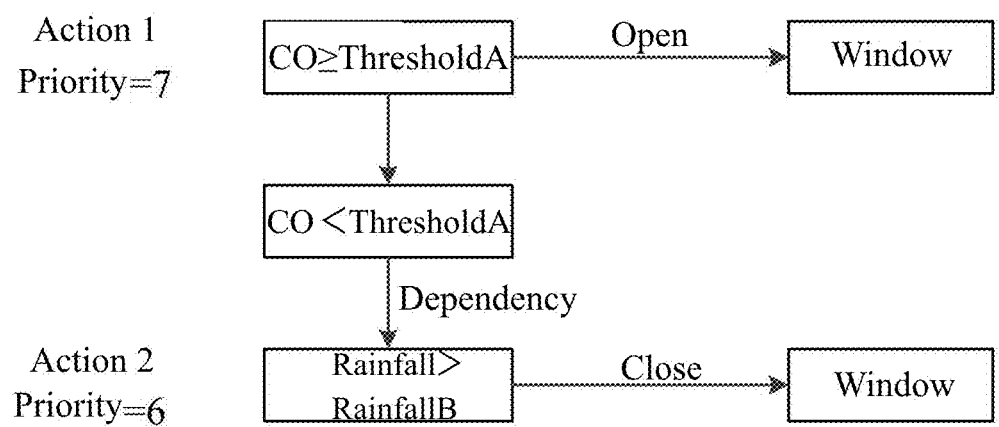
FIG. 5A shows a schematic example of creating action resources according to the embodiments of the present disclosure.

FIG. 5A shows a schematic example of creating the action resources according to the embodiments of the present disclosure. As shown in FIG. 5A, Action 1 already exists in the server, and its priority is set to 7. Action 1 may be used to open the window when the carbon monoxide (CO) concentration is greater than or equal to threshold A.

Then, the server may receive an action resource creation request for Action 2, where Action 2 may be used to close the window when the rainfall is greater than threshold B.

As mentioned above, according to the target resource (window) of Action 2 and the trigger condition of Action 2 (the rainfall is greater than threshold B), a priority of Action 2 may be set to be smaller than the priority of Action 1, for example, 6.

In the example shown in FIG. 5A, the smaller the priority value, the lower the priority. Those skilled in the art may understand that the priority value may be set in any manner without departing from the principle of the present disclosure. For example, the priority may be set such that the larger the value, the lower the priority.

In the example shown in FIG. 5A, according to the target resource (that is, window) targeted by Action 2, Action 1 targeting the same target resource (window) may be determined as a candidate action resource. Then, since the priority of Action 1 is higher than the priority of Action 2, the dependency condition of Action 2 may be determined according to the trigger condition of Action 1 (the carbon monoxide concentration is greater than or equal to threshold A). For example, the trigger condition of Action 1 may be reversed to obtain a new trigger condition that the carbon monoxide concentration is less than threshold A, and the new trigger condition may be set as the dependency condition of Action 2.

According to the aforementioned method, the action resource of Action 2 may be created, where the trigger condition of Action 2 is that the rainfall is greater than threshold B, and the dependency condition is that the carbon monoxide concentration is less than threshold A. In this case, when the conditions that the rainfall is greater than threshold B and the carbon monoxide concentration is less than threshold A are satisfied at the same time, the operation of closing the window may be performed.

Figure 5B:
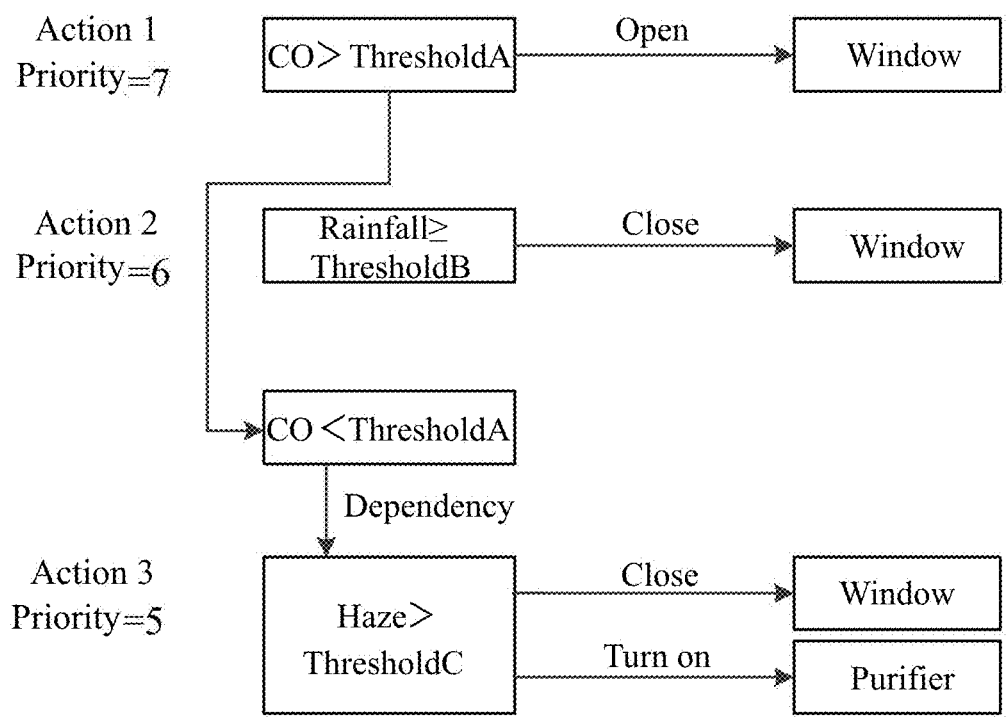
FIG. 5B shows another schematic example of creating action resources according to the embodiments of the present disclosure.

FIG. 5B shows a schematic example of creating the action resources according to the embodiments of the present disclosure. As shown in FIG. 5B, Action 1 and Action 2 already exist in the server, where the priority of Action 1 is set to 7, and the priority of Action 2 is set to 6. Action 1 may be used to open the window when the carbon monoxide (CO) concentration is greater than or equal to threshold A. Action 2 may be used to close the window when the rainfall is greater than threshold B.

Then, the server may receive an action resource creation request for Action 3, Action 3 may be used to close the window and simultaneously turn on the purifier when the haze parameter is greater than threshold C. According to the target resources of Action 3 (window and purifier) and the trigger condition of Action 3 (haze parameter is greater than threshold C), a priority of Action 3 may be set to 5.

In the example shown in FIG. 5B, according to the target resource (that is, window) targeted by Action 3, Action 1 and Action 2 targeting for the same target resource (window) may be determined as candidate action resources. Then, since the operation of Action 1 for the window is opposite to the operation of Action 3 for the window, while the operation of Action 2 for the window is the same as the operation of Action 3 for the window, and the priority of Action 1 is higher than that of Action 3, the dependency condition of Action 2 may be determined according to the trigger condition of Action 1 (that is, the carbon monoxide concentration is greater than or equal to threshold A). For example, the trigger condition of Action 1 may be reversed to obtain a new trigger condition that the carbon monoxide concentration is less than threshold A, and the new trigger condition may be set as the dependency condition of Action 3. For another example, a new trigger condition that "the carbon monoxide concentration is less than a threshold D, where D is less than A" may also be obtained according to the trigger condition that "the carbon monoxide concentration is greater than or equal to threshold A", and the obtained new trigger condition may be set as the dependency condition of Action 3.

As shown in FIG. 5B, for another target resource (that is, the purifier) of Action 3, there is no other action resource in the server that also performs operations for the purifier, thus, no corresponding dependency conditions are set for the purifier.

In other embodiments, if there is another action resource that also performs operations for the purifier in the server, another dependency condition for performing operations for the purifier may be determined according to the method provided in FIG. 4 of the present disclosure.

According to the aforementioned method, the action resource of Action 2 may be created, where the trigger condition of Action 2 is that the rainfall is greater than threshold B, and the dependency condition of Action 2 is that the carbon monoxide concentration is less than threshold A. In this case, when the conditions that the rainfall is greater than threshold B and the carbon monoxide concentration is less than threshold A are satisfied at the same time, the operation of closing the window may be performed.

Figure 6:
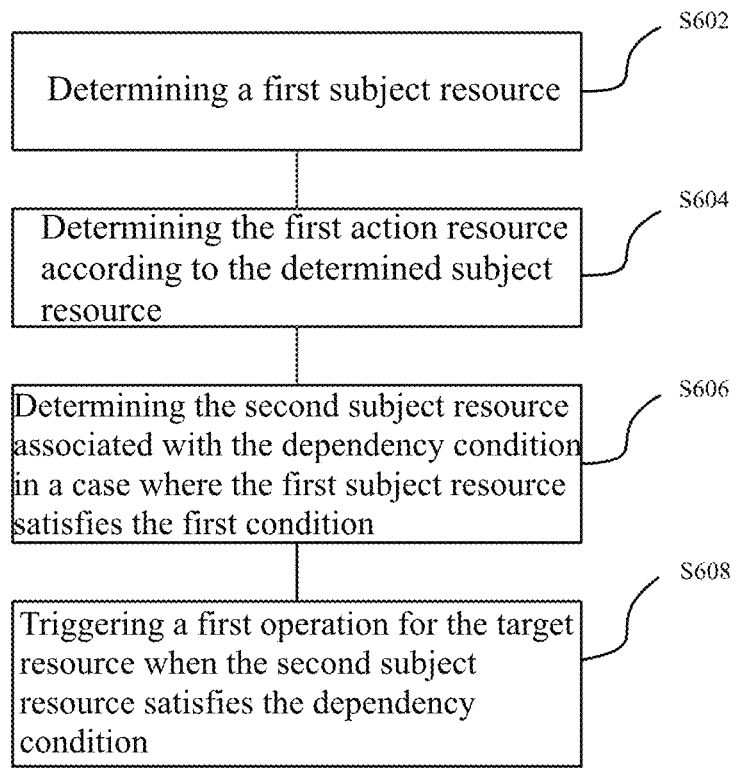
FIG. 6 shows a schematic flowchart of a method for triggering operations against a target resource according to embodiments of the present disclosure.

FIG. 6 shows a schematic flowchart of a method for triggering operations against the target resource according to the embodiments of the present disclosure.

As shown in FIG. 6, in step S602, a first subject resource may be determined. In some embodiments, sensor data may be received through various sensors to determine the first subject resource. For example, in the usage environment of the smart home, the sensor data may be received by sensors such as the carbon monoxide sensor, the rainfall sensor, the haze sensor, etc., and the received sensor data may be used to update the first subject resource.

In step S604, the first action resource may be determined according to the subject resource determined in step S602, where the first action resource is used to trigger a first operation for the target resource when a first condition and a dependency condition are satisfied at the same time. The dependency condition is determined according to a second action resource.

Taking the first subject resource as a rainfall parameter detected by the rainfall sensor as an example, the first action resource may be determined based on the rainfall parameter, where the first action resource is used to close the window when the conditions that the rainfall is greater than threshold B and the carbon monoxide content is less than threshold A are satisfied at the same time.

In step S606, the second subject resource associated with the dependency condition may be determined in a case where the first subject resource satisfies the first condition. For example, in the case where the rainfall is greater than threshold B, the second subject resource associated with the dependency condition (that is, the carbon monoxide content is less than threshold A) may be determined, that is, the carbon monoxide content.

In step S608, when the second subject resource satisfies the dependency condition, a first operation is triggered for the target resource. For example, when it is determined that the carbon monoxide content is less than threshold A, the closing operation may be triggered for the window.

Further, in step S608, when the second subject resource does not satisfy the dependency condition, the second action resource associated with the target resource and the second subject resource is determined, where the second action resource includes a second criterion which is used to trigger a second operation for the target resource according to a second condition. For example, when it is determined that the carbon monoxide content is greater than or equal to threshold A, a second action resource associated with the window and the carbon monoxide content may be determined, in which the second action resource includes the second criterion, and the second criterion is used to perform the opening operation for the window when the carbon monoxide content is greater than or equal to threshold A.

Therefore, when the second subject resource does not satisfy the dependency condition, it may be judged whether the second subject resource satisfies the second condition of the second action resource. In a case where the second subject resource satisfies the second condition of the second action resource, the second operation may be triggered for the target resource. That is, even when the rainfall is greater than threshold B, it is necessary to judge whether the dependency condition of the first action resource is satisfied, that is, whether the carbon monoxide content is less than threshold A. If the carbon monoxide content is greater than threshold A, then it may be judged whether the carbon monoxide content satisfies the trigger condition of the second action resource. If the carbon monoxide content satisfies the trigger condition of the second action resource, the opening operation is performed for the window according to the second action resource.

With the method for triggering operations against the target resource provided by the present disclosure, the execution of actions may be determined according to the dependency condition, so that, for example, the criterion with a low-priority will not affect the execution of the criterion with a high-priority, therefore, conflicts between criteria of different action resources may be avoided, and the execution efficiency of actions may be improved.

Figure 7:
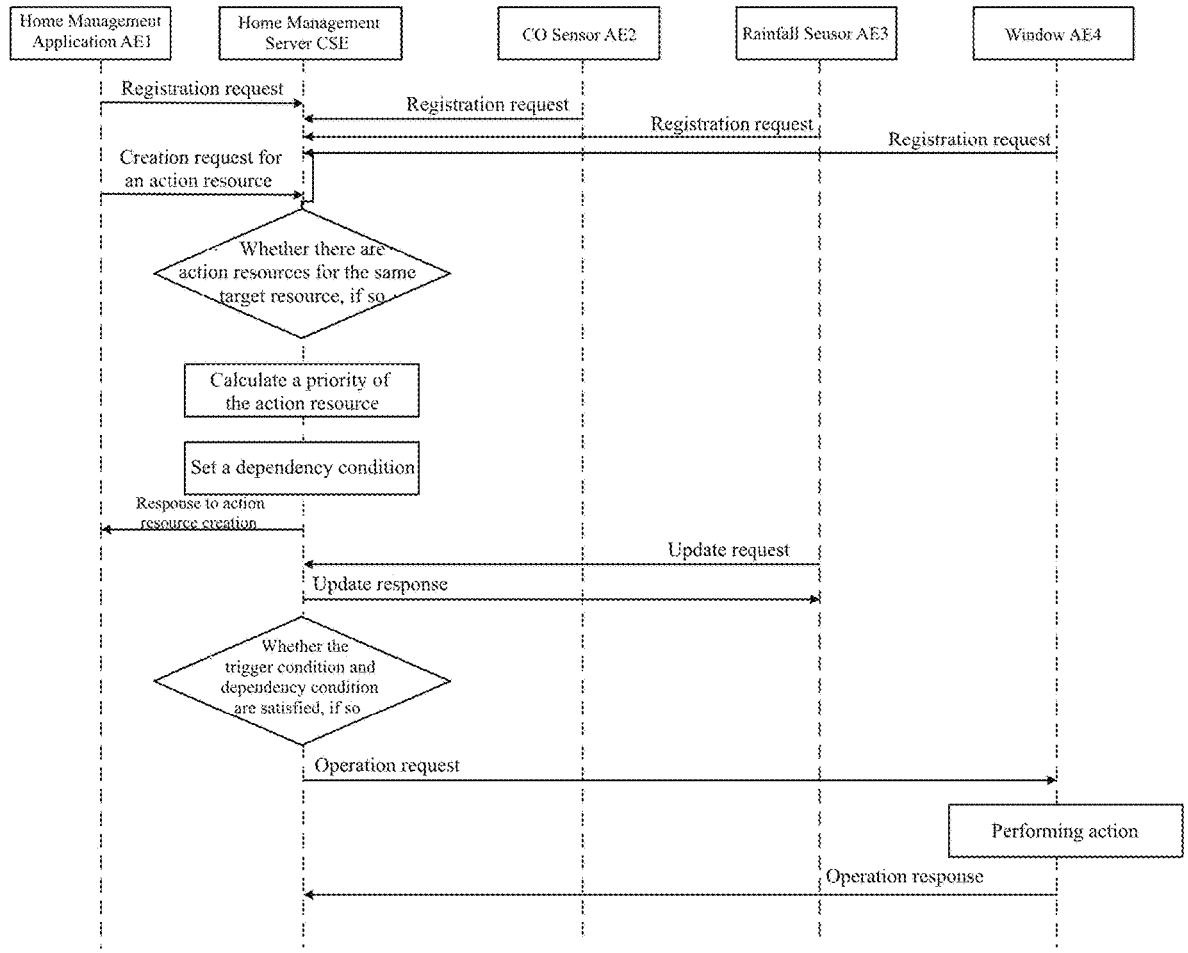
FIG. 7 shows a schematic example of triggering operations against a target resource according to embodiments of the present disclosure.

FIG. 7 shows a schematic example of triggering operations against the target resource according to the embodiments of the present disclosure. As shown in FIG. 7, a home management application AE1, a carbon monoxide sensor AE2, a rainfall sensor AE3, and a window controller AE4 are registered to the home management server CSE, respectively.

The home management application AE1 may transmit a creation request of the action resource (<action>) to the server CSE, where the creation request includes an action trigger subject (AE3), a target resource (window), a trigger condition (rainfall greater than threshold B), and a control action (close).

According to the creation request transmitted by the home management application AE1, the server CSE may judge whether there are other action resources having the same target resource (window) included in the creation request. If there is another action resource for the same target resource, the server CSE may determine, according to a trigger condition of the another action resource, the dependency condition for the action resource to be created by AE1 with the method provided in the present disclosure.

For example, the server CSE may compare the priority of the action resource to be created by AE1 with that of another action resource for the same target resource. If the priority of the another action resource for the same target resource is greater than the priority of the action resource to be created by AE1, then an inverse condition of the trigger condition for the another action resource to perform the operation for the target resource may be set as the dependency condition of the action resource to be created by AE1, and the action resource may be created based on the determined dependency condition.

Then, the server CSE may transmit a response that the action resource is successfully created to AE1.

After the action resource is created, the CSE may receive an update request for updating the subject resource from AE3 regularly and transmit an update response to AE3 according to the update request. For example, CSE may receive rainfall information from the rainfall sensor and transmit a response to the rainfall sensor. The CSE may then judge whether the information received from AE3 satisfies the trigger condition of the action and the dependency condition of the action. When the trigger condition of the action and the dependency condition of the action are satisfied, an operation request may be transmitted to the target resource. For example, in a case where the trigger condition that the rainfall is greater than threshold B and the dependency condition that the carbon monoxide content is less than threshold A are satisfied, the CSE may transmit an operation request to the window controller to control the window to be closed. The window controller may perform operations according to the received operation request and transmit an operation response signal to the CSE.

Figure 8:
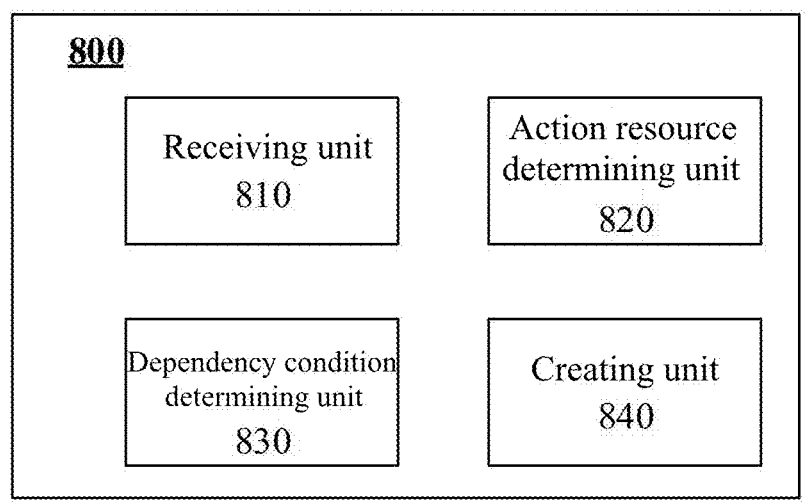
FIG. 8 shows a schematic block diagram of an apparatus for creating action resources performed by a general service entity according to embodiments of the present disclosure.

FIG. 8 shows a schematic block diagram of an apparatus for creating action resources performed by the general service entity according to the embodiments of the present disclosure.

As shown in FIG. 8, the apparatus 800 may include a receiving unit 810, an action resource determining unit 820, a dependency condition determining unit 830, and a creating unit 840.

The receiving unit 810 may be configured to receive a creation request for a first action resource, where the creation request includes an identifier of a target resource and a first criterion, and the first criterion is used for triggering a first operation for the target resource according to a first condition.

The first action resource may be a resource used to implement the first action. For example, when the application program wants to deploy one action on the service platform, it may transmit the creation request for the action resource to the service platform. For example, the home management application may deploy such an action on the home management server: when the concentration of carbon monoxide in the air is detected to be higher than a threshold A, an opening operation is performed for the window. The concentration of carbon monoxide in the air may be detected by a carbon monoxide sensor registered to the service platform, and the opening operation for the window may be performed by a window controller registered to the service platform.

The action resource determining unit 820 may be configured to determine a second action resource according to the target resource, wherein the second action resource includes a second criterion and the second criterion is used for triggering a second operation for the target resource according to a second condition. Taking the usage environment of the smart home as an example, it should be understood that when there are a plurality of smart control devices in the Internet of Things environment of the smart home, the application program may deploy a plurality of services to the same target object, that is, create a plurality of action resources for the same target object. The operations performed for the target object of each action resource and the trigger conditions of the operations may be different.

When a creation request for the action resource is received, other action resources with the same target resource may be determined as the second action resource among a plurality of resources stored in the server according to the target resource in the action resource.

In some embodiments, an action resource list including at least one candidate action resource may be determined, wherein each candidate action resource of the at least one candidate action resource includes the target resource. Then, at least one candidate action resource may be selected from the action resource list as the second action resource.

In one implementation, when selecting at least one candidate action resource as the second action resource from the action resource list, the selection may be made according to the operation for the target resource performed by the candidate action resource. The selection may be made according to the action performed by the candidate action resource for the target resource. For example, if the second operation performed by the candidate action resource for the target resource is different from the aforementioned first operation, the candidate action resource may be selected as the second action resource. In one example, the first operation may refer to setting the air conditioner to 25° C., and the second operation may refer to setting the air conditioner to 18° C. For another example, if the second operation performed by the candidate action resource for the target resource is opposite to the aforementioned first operation, the candidate action resource may be selected as the second action resource. In one example, the first operation may refer to open the window, and the second operation may refer to close the window.

In another implementation, when selecting at least one candidate action resource as the second action resource from the action resource list, the selection may also be made according to the priority of the candidate action resource. For example, a candidate action resource whose priority is higher than that of the first action resource may be determined as the second action resource. That is, a priority of the second action resource is higher than a priority of the first action resource.

The dependency condition determining unit 830 may be configured to determine a dependency condition for the first action based on the second condition.

In some embodiments, a condition that does not satisfy the second condition may be determined as the dependency condition of the first action. In one implementation, a set of candidate dependency conditions different from the second condition may be determined, and at least one candidate dependency condition of the set of candidate dependency conditions may be determined as the dependency condition of the first action. For example, a condition opposite to the second condition may be determined as the dependency condition of the first action.

For example, when the second condition is that a preset variable is greater than a first threshold A, the dependency condition may be determined as that the preset variable is less than or equal to the first threshold A. Further, the dependency condition may also be any condition that is opposite to the second condition. For example, the dependency condition may be determined as that the preset variable is less than or equal to a second threshold B, where B<A. For another example, when the second condition is that the host is at home, the dependency condition may be determined as that the host is not at home. Similarly, when the second condition is that the preset variable is less than a third threshold C, the dependency condition may be determined as that the preset variable is greater than or equal to the third threshold C. Further, the dependency condition may also be determined as that the preset variable is greater than or equal to a fourth threshold D, where D>C.

In addition, the dependency condition may also be any other condition different from the second condition. When the second condition is that the weather is sunny, the dependency condition may be determined as that the weather is rainy or the weather is cloudy.

The creating unit 840 may be configured to create the first action resource according to the dependency condition, where the first action is used to trigger the first operation for the target resource when the first condition and the dependency condition are all satisfied at the same time.

With the apparatus for creating the action resource provided by this application, the dependency condition of the action resource to be created may be determined according to the trigger condition of the action resource with respect to the same target, so that the action involved in the created action resource need to trigger the corresponding action when its own trigger condition and the dependency condition are satisfied at the same time, thus, for example, the criterion with a low-priority will not affect the execution of the criterion with a high-priority, therefore, conflicts between criteria of different action resources may be avoided, and the execution efficiency of actions may be improved.

Figure 9:
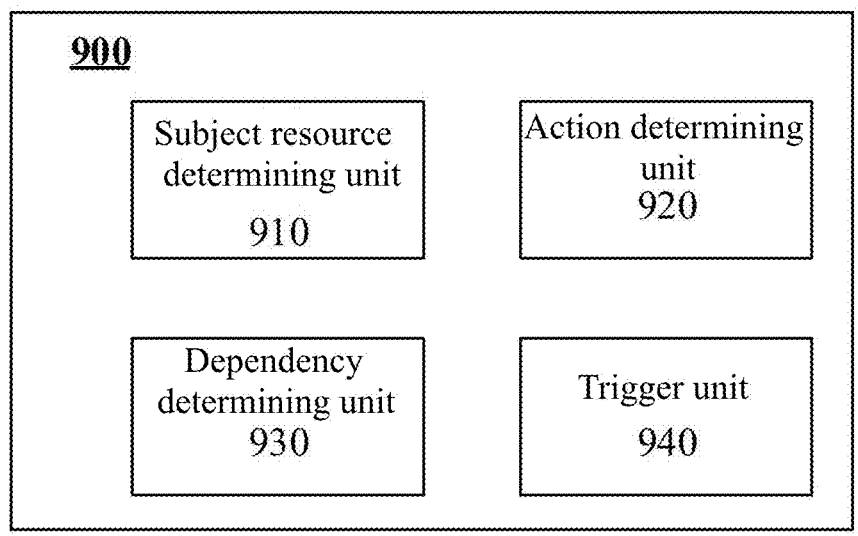
FIG. 9 shows a schematic block diagram of an apparatus for triggering operations against a target resource according to embodiments of the present disclosure.

FIG. 9 shows a schematic block diagram of an apparatus for triggering operations against a target resource according to the embodiments of the present disclosure. As shown in FIG. 9, the apparatus 900 may include a subject resource determining unit 910, an action determining unit 920, a dependency determining unit 930, and a trigger unit 940.

The subject resource determining unit 910 may be configured to determine a first subject resource. In some embodiments, sensor data may be received through various sensors to determine the first subject resource. For example, in the usage environment of the smart home, the sensor data may be received by sensors such as the carbon monoxide sensor, the rainfall sensor, the haze sensor, etc., and the received sensor data may be used to update the first subject resource.

The action determining unit 920 may be configured to determine the first action resource according to the subject resource determined by the subject resource determining unit 910, where the first action resource is used to trigger a first operation for the target resource when a first condition and a dependency condition are satisfied at the same time. The dependency condition is determined according to a second action resource.

Taking the first subject resource as a rainfall parameter detected by the rainfall sensor as an example, the first action resource may be determined based on the rainfall parameter, where the first action resource is used to close the window when the conditions that the rainfall is greater than threshold B and the carbon monoxide content is less than threshold A are satisfied at the same time.

The dependency determination unit 930 may be configured to determine the second subject resource associated with the dependency condition in a case where the first subject resource satisfies the first condition. For example, in the case where the rainfall is greater than threshold B, the second subject resource associated with the dependency condition (that is, the carbon monoxide content is less than threshold A) may be determined, that is, the carbon monoxide content.

The trigger unit 940 may be configured to trigger a first operation for the target resource when the second subject resource satisfies the dependency condition. For example, when it is determined that the carbon monoxide content is less than threshold A, the closing operation may be triggered for the window.

Further, when the second subject resource does not satisfy the dependency condition, the trigger unit 840 may be configured to determine the second action resource associated with the target resource and the second subject resource, where the second action resource includes a second criterion which is used to trigger a second operation for the target resource according to a second condition. For example, when it is determined that the carbon monoxide content is greater than or equal to threshold A, a second action resource associated with the window and the carbon monoxide content may be determined, in which the second action resource includes the second criterion, and the second criterion is used to perform the opening operation for the window when the carbon monoxide content is greater than or equal to threshold A.

Therefore, when the second subject resource does not satisfy the dependency condition, the action determining unit 920 is further configured to determine the second action resource associated with the target resource and the second subject resource, where the second action resource includes a second criterion which is used to trigger a second operation for the target resource according to a second condition. Whether the second subject resource satisfies the second condition of the second action resource may be further determined, and in the case where the second subject resource meets the second condition of the second action resource, the trigger unit 940 may be further configured to trigger the second operation for the target resource. That is, even when the rainfall is greater than threshold B, it is necessary to judge whether the dependency condition of the first action resource is satisfied, that is, whether the carbon monoxide content is less than threshold A. If the carbon monoxide content is greater than threshold A, then it may be judged whether the carbon monoxide content satisfies the trigger condition of the second action resource. If the carbon monoxide content satisfies the trigger condition of the second action resource, the opening operation is performed for the window according to the second action resource.

With the apparatus for triggering operations against the target resource provided by the present disclosure, the execution of actions may be determined according to the dependency condition, so that, for example, the criterion with a low-priority will not affect the execution of the criterion with a high-priority, therefore, conflicts between criteria of different action resources may be avoided, and the execution efficiency of actions may be improved.

In some cases, the execution effect of the action cannot be effectively managed by transmitting a single action request. Therefore, by expanding the action resource, increasing the time range and trigger cycle, it is possible to judge whether the trigger condition is satisfied for each certain trigger cycle within the time range, and if so, the operation is triggered.

In addition, considering the situation of a plurality of actions, an identifier of the action trigger may be added in the target resource. Once a certain action is triggered, the identifier is set to be true, only when the priority of another action is higher than that of the action, the operation of another action may be triggered for the same target resource.

Hereinafter, further embodiments of the present application will be described in conjunction with the time range and identifier of the action trigger.

Figure 10A:
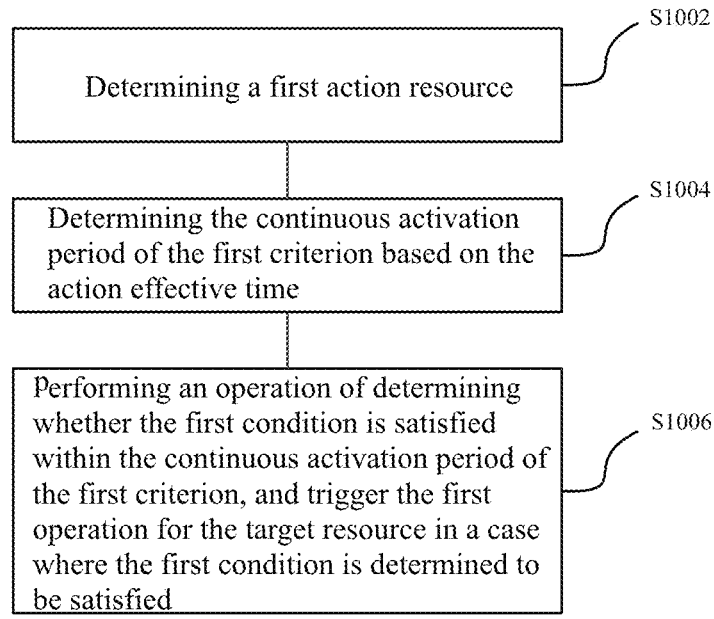
FIG. 10A shows a schematic flowchart of an action trigger method according to embodiments of the present disclosure.

FIG. 10A shows a schematic flowchart of the action trigger method according to the embodiments of the present disclosure. The method 1000 shown in FIG. 10A may be performed by the aforementioned general service entity.

As shown in FIG. 10A, in step S1002, a first action resource may be determined. The first action resource includes an identifier of a target resource, a first criterion and an action effective time, where the first criterion is used for triggering a first operation for the target resource according to a first condition.

The first action resource may be a resource used to implement a first action. For example, when an application program wants to deploy an action on the service platform, it may transmit a creation request for the action resource to the service platform. For example, the home management application may deploy such an action on the home management server: when the concentration of carbon monoxide in the air is detected to be higher than a threshold A, an opening operation is performed for the window. The concentration of carbon monoxide in the air may be detected by a carbon monoxide sensor registered to the service platform, and the opening operation for the window may be performed by a window controller registered to the service platform.

Taking the target resource as a window, and the first operation for the target resource is opening the window as an example, due to the influence of the external environment, after the general service entity performs the first operation (i.e., opening the window), the state of the window may change (such as closed by the wind). In this case, the attribute of the action effective time set in the action resource may be used to repeatedly detect whether the first condition is satisfied within a predetermined time period, so that the execution effect of the action may be maintained within the predetermined time period.

The action effective time may indicate a continuous activation period of the first criterion. In the continuous activation period of the first criterion, the general service entity may detect whether the first condition is satisfied for the target resource at least once, and may trigger the first operation according to the detection result. Outside the continuous activation period of the first criterion, the general service entity may perform a single detection for whether the first condition is satisfied for the target resource, or do not perform a detection for whether the first condition is satisfied for the target resource.

In some embodiments, the first action resource may also include a preset state of the target resource. When the preset state of the target resource is satisfied, whether the first condition is satisfied is judged, and the first operation is triggered after first condition is satisfied.

The preset state of the target resource may be preset or dynamically set. For example, a state change of the target resource is obtained after the first action is triggered, and the content before the state change is set as the preset state.

In step S1004, the continuous activation period of the first criterion may be determined based on the action effective time. In some embodiments, action effective time attributes may store information indicating the continuous activation period of the first criterion. For example, the action effective time attributes may be set to indicate that a certain time period of one day (for example, from 8 am to 10 am) is the continuous activation period of the first criterion.

In some implementations, the aforementioned continuous activation period may be a preset fixed period. In other implementations, if it is considered that the preset fixed period is relatively short, the continuous activation period may be automatically extended when the continuous activation period expires.

In step S1006, within the continuous activation period of the first criterion, an operation of determining whether the first condition is satisfied is performed, where, in a case where the first condition is determined to be satisfied, the first operation is triggered for the target resource. In some embodiments, the general service entity may perform the operation of determining whether the first condition is satisfied based on a predetermined criterion.

In some implementations, the operation of determining whether the first condition is satisfied may be performed in a predefined trigger cycle. For example, the predefined trigger cycle may be 10 minutes or 30 minutes. The operation of determining whether the first condition is satisfied may be repeated once every trigger cycle. For another example, the predefined trigger cycle may also be an irregular time interval. For example, the trigger cycle of the action may be equally spaced or unequal spaced. In some examples, the time interval of the trigger cycle of the action that occurred before may be smaller, while the time interval of the trigger cycle of the action that occurred later may be larger. Those skilled in the art may arbitrarily set the predefined trigger cycle according to actual situations. Within the time range of the action, one trigger cycle is defined, such as 10 minutes, to determine whether the first condition is satisfied when the trigger cycle is reached, so that a frequency of determining whether the first condition is satisfied may be controllable and the system consumption is reduced.

In other implementations, the operation of determining whether the first condition is satisfied may be performed in response to that a predefined detection condition is satisfied, a trigger condition may be predefined for performing the operation of determining whether the first condition is satisfied, and when the trigger condition is satisfied, the operation of determining whether the first condition is satisfied may be triggered to be performed. For example, an action trigger for other objects may be determined as the predefined detection condition. For example, whether the first condition for performing the first operation on the window is satisfied is detected when the air conditioner is turned on. For another example, a preset state of the object may be set as the aforementioned detection condition. When the execution result of the first operation indicates that the first operation is correctly triggered, or when the preset state of the object has not changed, then whether the current state satisfies the first criterion is detected.

Figure 10B:
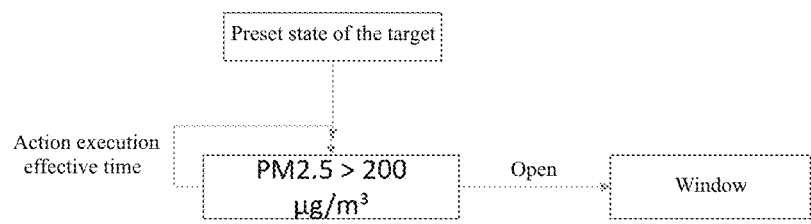
FIG. 10B shows a process of detecting whether a first condition is satisfied based on a preset state of the object.

For example, when the preset state of the window is a closed state, and the first operation refers to an operation of closing the window, even if the first condition is satisfied, the general service entity does not need to transmit to the window an operation instruction for closing the window, because according to the preset state, it may be determined that the window does not need to be operated currently (that is, the window is closed). FIG. 10B shows a process of detecting whether the first condition is satisfied based on the preset state of the object. Within the continuous activation period determined according to the action effective time, the first criterion refers to opening the window when a concentration of PM 2.5 is detected to be greater than 200 μg/m3. Before performing the detection of the concentration of PM 2.5, whether the preset state of the object has changed may be detected firstly.

In fact, those skilled in the art may set any condition as the aforementioned predefined detection condition according to the actual situations.

In some embodiments, the method 1000 may further include obtaining an execution result of the first operation after the first operation is triggered for the target resource. The execution result indicates whether the first operation is triggered correctly.

After the first operation is transmitted, there are two situations: success or failure; if the first operation fails, it may indicate that the operation cannot be performed on the object, so there is no need to transmit the first operation again.

If the aforementioned execution result indicates that the first operation is correctly triggered, it means that the current target resource is working normally and may perform the corresponding operation. Correspondingly, if the aforementioned execution result indicates that the first operation on the target resource is not triggered correctly, it means that the operation cannot be performed on the current target resource.

In some implementations, in a case where the execution result indicates that the first operation is not correctly triggered, the trigger of the first operation for the target resource is terminated within the continuous activation period of the first criterion. That is, when the execution result indicates that the first operation cannot be performed on the target resource, even if it is within the continuous activation period of the first criterion, the general service entity will no longer try to perform the corresponding operation on the target resource.

With the aforementioned action trigger method provided in the present application, the general service entity may maintain the operation on the target resource within a predefined activation period, so as to improve action execution effect.

Figure 11:
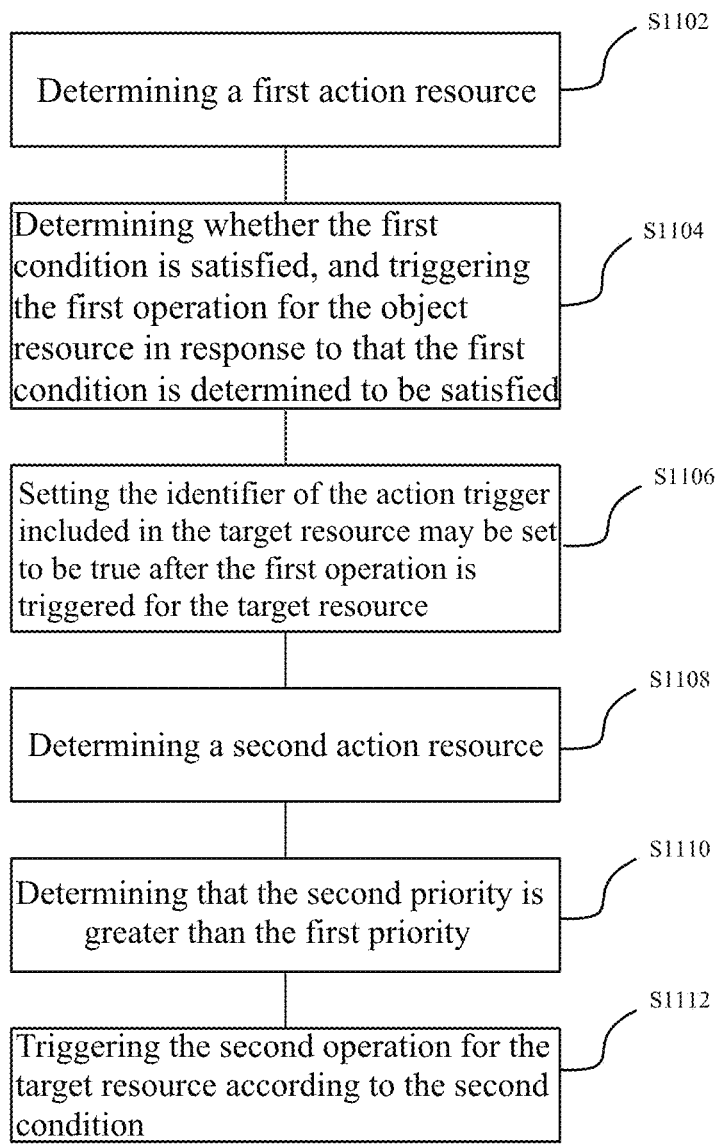
FIG. 11 shows yet another schematic flowchart of an action trigger method according to embodiments of the present disclosure.

FIG. 11 shows yet another schematic flowchart of an action trigger method according to the embodiments of the present disclosure. The method 1100 shown in FIG. 11 may be performed by the aforementioned general service entity.

In step S1102, a first action resource may be determined. The first action resource includes an identifier of a target resource and a first criterion, and the first criterion is used for triggering a first operation for the target resource according to a first condition.

In some embodiments, the first action resource may further include an action effective time, and the action effective time may indicate a continuous activation period of the first criterion. In the continuous activation period of the first criterion, the general service entity may detect whether the first condition is satisfied for the target resource at least once, and may trigger the first operation according to the detection result.

In step S1104, an operation of determining whether the first condition is satisfied may be performed, in which, in a case where it is determined that the first condition is satisfied, the first operation is triggered for the target resource.

In step S1106, after the first operation is triggered for the target resource, an identifier of the action trigger included in the target resource may be set to be true.

In some embodiments, when the identifier of the action trigger is set to be true, the identifier of the action trigger may also be associated with the first action resource that triggers the first operation. For example, the identifier of the action trigger may be set to include a resource identifier of the first action resource and/or a first priority identifier for the first action resource.

The identifier of the action trigger may be an attribute included in the target resource. The identifier of the action trigger may be used to identify that the first operation is occupying the target resource. When the identifier of the action trigger is set to be true, only other actions with higher priority may trigger operations on the same target resource.

In some implementations, when it is determined that it is not within the continuous activation period of the first criterion, the identifier of the action trigger may be set to be false. In this case, other operations may be triggered for the target resource, so that the target resource may be performed by other operations.

In step S1108, a second action resource may be determined. The second action resource includes an identifier of the target resource and a second criterion, and the second criterion is used for triggering a second operation for the target resource according to a second condition.

In some embodiments, the first action resource includes a first priority, and the second action resource includes a second priority.

In step S1110, it may be determined that the second priority is greater than the first priority. As mentioned above, when the identifier of the action trigger indicates that the first operation is occupying the target resource, only actions with higher priority may trigger operations for the same target resource. Therefore, in the case where it is determined that the second priority is greater than the first priority, the second operation may be triggered according to the second condition for the target resource in step S1112.

It should be understand that when the second priority is lower than the first priority, triggering the second operation according to the second condition for the target resource will not be performed.

After the second operation is triggered for the target resource according to the second condition, the identifier of the action trigger in the target resource may be updated, so that the identifier of the action trigger is associated with the second action resource. For example, the identifier of the action trigger may be set to include a resource identifier of the second action resource and/or a second priority identifier for the second action resource. In this case, the identifier of the action trigger may be used to identify that the second operation is occupying the target resource. In the subsequent operations, only other operations with a priority higher than the second priority may trigger other operations on the target resource.

In some embodiments, the method 1100 may further include creating an action management resource. The action management resource instance includes the identifier of the target resource, an action resource identifier list corresponding to the target resource, and an action resource identifier currently operating the target resource. The action resource identifier list may include identifiers of at least one action resource available to the target resource. The action resource identifier currently operating the target resource may indicate the action resource currently occupying the target resource. For example, after the first operation is triggered according to the first condition, the action resource identifier currently operating the target resource may be set as an identifier of an action that triggers the first operation.

With the aforementioned action management resource, the general service entity may realize the management of the currently operated target resource.

With the aforementioned action trigger method provided in this application, in a case where there are a plurality of actions for the same target resource, the identifier of the action trigger may be used to indicate which operation the target resource is currently occupied, so that it may be determined whether other operations may be triggered to the target resource according to the priority.

Figure 12:
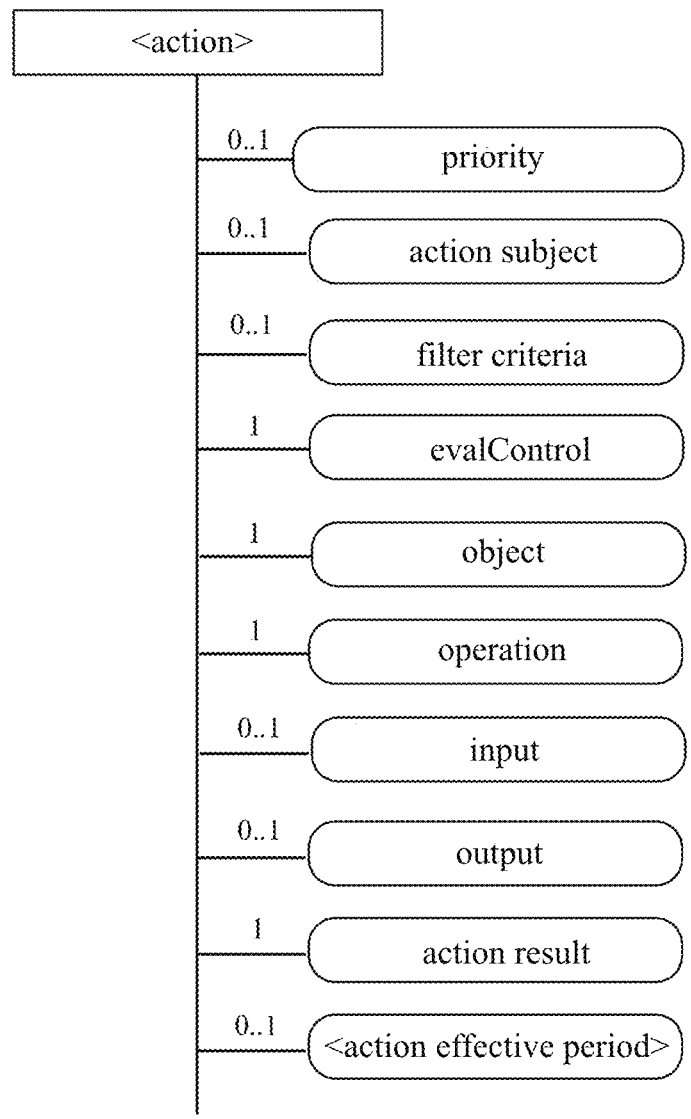
FIG. 12 shows another exemplary structure of an action resource according to embodiments of the present application.

FIG. 12 shows another exemplary structure of an action resource according to the embodiments of the present application. Different from the action resource shown in FIG. 3B, the action resource in FIG. 12 adds an action effective time attribute. The action effective time attribute may be used to indicate the continuous activation period of a criterion corresponding to the action resource.

Figure 13:
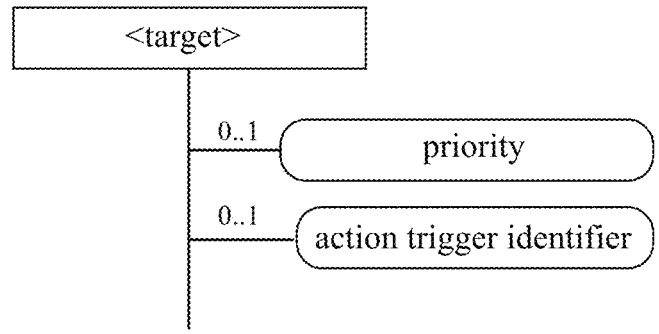
FIG. 13 shows an exemplary structure of a target resource according to embodiments of the present application.

FIG. 13 shows an exemplary structure of a target resource according to the embodiments of the present application. As shown in FIG. 13, the target resource may include an attribute of an action trigger identifier and a priority attribute. The attribute of an action trigger identifier and the priority attribute shown in FIG. 13 may be set in conjunction with the process as described in FIG. 11.

Figure 14:
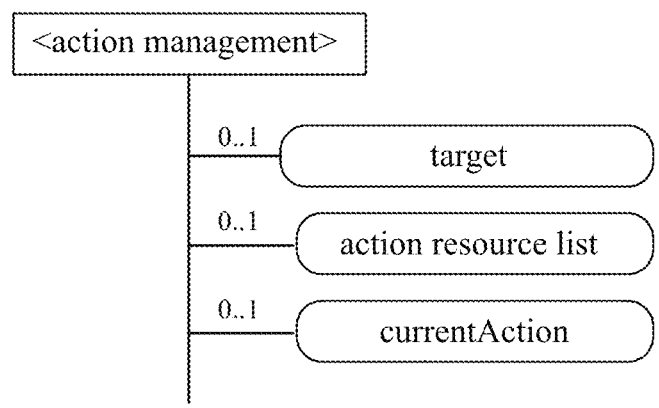
FIG. 14 shows an exemplary structure of an action management resource according to embodiments of the present application.

FIG. 14 shows an exemplary structure of an action management resource according to the embodiments of the present disclosure. As shown in FIG. 14, the action management resource (actionManager) may include identifiers of target resources (object1, object2), an action resource identifier list corresponding to the target resource (actions), and an action resource identifier currently operating the target resource (currentAction).

One non-transitory computer-readable medium may take many forms, including tangible storage media, carrier wave media, or physical transmission media, and so on. Stable storage media may include: optical disks or magnetic disks, and other storage systems used in computers or similar devices that may implement the system components described in the drawings. Unstable storage media may include dynamic memories, for example, a main memory of a computer platform. Tangible transmission media may include coaxial cables, copper cables, and optical fibers, for example, lines that form a bus inside the computer system. Carrier wave transmission media may transmit electric signals, electromagnetic signals, acoustic wave signals, or light wave signals, and so on. These signals may be generated by radio frequency or infrared data communication methods. Common computer readable media include hard disks, floppy disks, magnetic tapes, and any other magnetic media; CD-ROMs, DVDs, DVD-ROMs, and any other optical media; punch cards, and any other physical storage media containing small hole patterns; RAMs, PROMs, EPROMS, FLASH-EPROMs, and any other memory chips or tapes; carrier waves, cables for transmitting data or instructions, or connecting apparatuses for transmitting carrier waves, and any other program codes and/or data that may be read by computers. Many of these forms of computer-readable media may appear in the processes of the processor performing instructions and delivering one or more results.

The "module" in this application refers to logic or a set of software instructions stored in hardware or firmware. The "module" referred to herein may be performed by software and/or hardware modules, or stored in any non-transitory computer-readable medium or other storage devices. In some embodiments, one software module may be compiled and linked into one executable program. Obviously, the software module herein may respond to information delivered by itself or other modules, and/or may respond when certain events or interrupts are detected. The software module may be provided on one non-transitory computer-readable medium, and the software module may be configured to perform operations on the computing device (for example, the processor 220). The non-transitory computer-readable medium herein may be an optical disc, a digital optical disc, a flash disk, a magnetic disk, or any other kind of tangible medium. The software module may also be obtained by way of digital download (the digital download herein also includes data stored in a compressed package or an installation package, which needs to be decompressed or decoded before execution). Codes of the software module herein may be partially or completely stored in the storage device of the computing device that performs operations, and used in the operations of the computing device. Software instructions may be embedded in firmware, for example, an erasable programmable read-only memory (EPROM). Obviously, the hardware module may include logic units connected together, for example, gates, triggers, and/or including programmable units, such as, programmable gate arrays or processors. Functions of the modules or the computing device described herein are preferably implemented as software modules, but may also be expressed in hardware or firmware. In general, the modules described herein are logical modules and are not limited by their specific physical form or memory. One module may be combined with other modules, or divided into a series of sub-modules.

All or a part of the software may sometimes communicate through a network, such as the Internet or other communication networks. Such communication may load software from one computer device or processor to another, for example, loading from a server or host computer of an Internet of Things communication system to a hardware platform of a computer environment, or other computer environments realizing the system, or a system with similar functions related to providing information required by the Internet of Things communication system. Therefore, another non-transitory medium that may transmit software elements may also be used as a physical connection between local devices, such as light waves, electric waves, electromagnetic waves, etc., to achieve propagation through cables, optical cables, or air, etc. Physical media used for carrying waves, such as cables, wireless connections, optical cables and the like, may also be considered as media that carry software. All other terms as used herein indicating non-transitory computer or machine "readable medium" refer to a medium that participates in execution of any instruction by the processor, unless a tangible "storage" medium is limited.

Unless otherwise defined, all terms (including technical and scientific terms) as used herein have the same meanings as commonly understood by those of ordinary skill in the art to which the present disclosure belongs. It should also be understood that terms such as those defined in ordinary dictionaries should be interpreted as having meanings consistent with those in the context of related technologies, and should not be interpreted in idealized or extremely formalized meanings, unless explicitly defined as such herein.

The above is an illustration of the present disclosure and should not be considered as a limitation thereof. Although several exemplary embodiments of the present disclosure have been described, those skilled in the art will readily understand that many modifications may be made to the exemplary embodiments without departing from the novel teachings and advantages of the present disclosure. Therefore, all these modifications are intended to be included in the scope of the present disclosure defined by the claims. It should be understood that the above is an illustration of the present disclosure, and should not be considered as being limited to the disclosed specific embodiments, and modifications to the disclosed embodiments and other embodiments are intended to be included in the scope of the appended claims. The present disclosure is defined by the claims and their equivalents.

What is claimed is:

1. An action trigger method performed by a general service entity, comprising:
    determining a first action resource, wherein the first action resource comprises an identifier of a target resource and a first criterion, and the first criterion is used for triggering a first operation for the target resource according to a first condition;
    determining a second action resource according to the target resource, wherein the second action resource comprises a second criterion, and the second criterion is used for triggering a second operation for the target resource according to a second condition; and
    determining a dependency condition for a first action according to the second condition, wherein the first action is used for triggering the first operation for the target resource in response to that the first condition and the dependency condition are all satisfied.

2. The method according to claim 1, wherein determining the second action resource according to the target resource comprises:
    determining an action resource list comprising at least one candidate action resource, wherein each candidate action resource of the at least one candidate action resource comprises the target resource; and
    selecting at least one candidate action resource from the action resource list as the second action resource.

3. The method according to claim 1, wherein the second operation is different from the first operation.

4. The method according to claim 3, wherein the second operation is opposite to the first operation.

5. The method according to claim 1, wherein a priority of the second action resource is higher than a priority of the first action resource.

6. The method according to claim 5, wherein the priority of the first action resource is determined according to at least one of the target resource and the first criterion.

7. The method according to claim 1, wherein the second condition is that a preset variable is greater than a first threshold, and the dependency condition is that the preset variable is less than or equal to the first threshold.

8. The method according to claim 7, wherein the dependency condition is that the preset variable is less than or equal to a second threshold, wherein the second threshold is less than the first threshold.

9. The method according to claim 1, wherein the first condition comprises an action effective time of the first action, the second condition comprises an action effective time of the second action, and the action effective time of the first action overlaps with the action effective time of the second action.

10. A non-transitory computer-readable action trigger apparatus, comprising:
  at least a processor, and
  a non-transitory memory with instructions thereon,
  wherein the instructions upon execution by the processor, cause the processor to:
  determine a first action resource, wherein the first action resource comprises an identifier of a target resource and a first criterion, and the first criterion is used for triggering a first operation for the target resource according to a first condition;
  determine a second action resource according to the target resource, wherein the second action resource comprises a second criterion, and the second criterion is used for triggering a second operation for the target resource according to a second condition; and
  determine a dependency condition for a first action according to the second condition,
  wherein the first action is used for triggering the first operation for the target resource in response to that the first condition and the dependency condition are all satisfied.

11. The apparatus according to claim 10, wherein determining the second action resource according to the target resource comprises:
  determining an action resource list comprising at least one candidate action resource, wherein each candidate action resource of the at least one candidate action resource comprises the target resource; and
  selecting at least one candidate action resource from the action resource list as the second action resource.

12. The apparatus according to claim 10, wherein the second operation is different from the first operation.

13. The apparatus according to claim 12, wherein the second operation is opposite to the first operation.

14. The apparatus according to claim 10, wherein a priority of the second action resource is higher than a priority of the first action resource.

15. The apparatus according to claim 14, wherein the priority of the first action resource is determined according to at least one of the target resource and the first criterion.

16. The apparatus according to claim 10, wherein the second condition is that a preset variable is greater than a first threshold, and the dependency condition is that the preset variable is less than or equal to the first threshold.

17. The apparatus according to claim 16, wherein the dependency condition is that the preset variable is less than or equal to a second threshold, wherein the second threshold is less than the first threshold.

18. The apparatus according to claim 10, wherein the first condition comprises an action effective time of the first action, the second condition comprises an action effective time of the second action, and the action effective time of the first action overlaps with the action effective time of the second action.

19. An electronic device, comprising a processor and a memory, wherein the memory stores instructions thereon, which, when performed by the processor, cause the processor to perform the method according to claim 1.

20. A non-transitory computer-readable storage medium having instructions stored thereon, which, when performed by a computer, cause the computer to perform the method according to claim 1.

* * * * *